US009183046B2

(12) United States Patent
Tsirkin

(10) Patent No.: US 9,183,046 B2
(45) Date of Patent: Nov. 10, 2015

(54) NETWORK ADDRESS RETRIEVAL FOR LIVE MIGRATION OF A GUEST SYSTEM IN A VIRTUAL MACHINE SYSTEM

(75) Inventor: Michael Tsirkin, Yokneam (IL)

(73) Assignee: Red Hat Israel, Ltd., Raanana (IL)

( * ) Notice: Subject to any disclaimer, the term of this patent is extended or adjusted under 35 U.S.C. 154(b) by 444 days.

(21) Appl. No.: 12/913,033

(22) Filed: Oct. 27, 2010

(65) Prior Publication Data

US 2012/0110181 A1 May 3, 2012

(51) Int. Cl.
*G06F 9/48* (2006.01)

(52) U.S. Cl.
CPC .................................. *G06F 9/4856* (2013.01)

(58) Field of Classification Search
CPC . G06F 15/173; G06F 9/45545; G06F 9/4555; G06F 9/45554; G06F 3/0647; G06F 17/303; G06F 9/50; G06F 11/1484; G06F 9/4856
USPC ........................ 709/226, 223, 224; 718/1, 104
See application file for complete search history.

(56) References Cited

U.S. PATENT DOCUMENTS

| | | | |
|---|---|---|---|
| 7,512,769 B1 * | 3/2009 | Lowell et al. | 711/203 |
| 7,792,918 B2 * | 9/2010 | Corry et al. | 709/216 |
| 7,917,617 B1 * | 3/2011 | Ponnapur et al. | 709/224 |
| 8,190,769 B1 * | 5/2012 | Shukla et al. | 709/238 |
| 8,381,209 B2 * | 2/2013 | Reumann et al. | 718/1 |
| 2005/0268298 A1 * | 12/2005 | Hunt et al. | 718/1 |
| 2008/0133709 A1 * | 6/2008 | Aloni et al. | 709/218 |
| 2008/0163207 A1 * | 7/2008 | Reumann et al. | 718/1 |
| 2008/0186990 A1 * | 8/2008 | Abali et al. | 370/419 |
| 2009/0182928 A1 * | 7/2009 | Becker et al. | 711/6 |
| 2009/0198862 A1 * | 8/2009 | Okitsu et al. | 710/316 |
| 2009/0249366 A1 * | 10/2009 | Sen et al. | 719/327 |
| 2009/0313445 A1 * | 12/2009 | Pandey et al. | 711/162 |
| 2010/0017800 A1 * | 1/2010 | Dow et al. | 718/1 |
| 2010/0036913 A1 * | 2/2010 | Imai | 709/205 |
| 2010/0107162 A1 * | 4/2010 | Edwards et al. | 718/1 |
| 2010/0115080 A1 * | 5/2010 | Kageyama | 709/223 |
| 2010/0165877 A1 * | 7/2010 | Shukla et al. | 370/254 |
| 2010/0257269 A1 * | 10/2010 | Clark | 709/226 |
| 2011/0087774 A1 * | 4/2011 | Pope et al. | 709/224 |
| 2011/0090911 A1 * | 4/2011 | Hao et al. | 370/395.53 |
| 2011/0107044 A1 * | 5/2011 | Young et al. | 711/162 |
| 2011/0126269 A1 * | 5/2011 | Youngworth | 726/4 |

(Continued)

FOREIGN PATENT DOCUMENTS

WO   WO 2011153038 A2 * 12/2011

OTHER PUBLICATIONS

Reames et al., "A Hypervisor for Embedded Computing", 2007.*

(Continued)

*Primary Examiner* — O. C. Vostal
(74) *Attorney, Agent, or Firm* — Lowenstein Sandler LLP

(57) ABSTRACT

A method and system for managing network addresses of a guest during live migration in a virtual machine system. A computer system hosts a guest that is to migrate from a source hypervisor in the computer system to a target hypervisor during operation of the computer system. In response to the indication, the source hypervisor retrieves an address list of the guest from a network device, where the address list identifies one or more network addresses of the guest in one or more networks. The source hypervisor then forwards the address list to the target hypervisor, which notifies the one or more networks of the migration of the guest.

22 Claims, 6 Drawing Sheets

(56) References Cited

U.S. PATENT DOCUMENTS

| | | | |
|---|---|---|---|
| 2011/0134761 A1* | 6/2011 | Smith et al. | 370/252 |
| 2011/0302577 A1* | 12/2011 | Reuther et al. | 718/1 |
| 2011/0314470 A1* | 12/2011 | Elyashev et al. | 718/1 |
| 2012/0023494 A1* | 1/2012 | Harrison et al. | 718/1 |
| 2012/0059930 A1* | 3/2012 | Devarakonda et al. | 709/224 |
| 2012/0102258 A1* | 4/2012 | Hepkin et al. | 711/6 |
| 2012/0173757 A1* | 7/2012 | Sanden | 709/238 |
| 2012/0291115 A1* | 11/2012 | Monk et al. | 726/11 |
| 2012/0303799 A1* | 11/2012 | Hadas et al. | 709/224 |
| 2013/0061224 A1* | 3/2013 | Reumann et al. | 718/1 |

OTHER PUBLICATIONS

Barham et al., "Xen 2002", 2003.*
Hansen et al., "Self-migration of Operating Systems", 2004.*
Silvera et al., "IP Mobility to Support Live Migration of Virtural Machines Across Subnets", 2009.*

* cited by examiner

NETWORK ADDRESS RETRIEVAL FOR LIVE MIGRATION OF A GUEST SYSTEM IN A VIRTUAL MACHINE SYSTEM

TECHNICAL FIELD

Embodiments of the present invention relate to a computer system, and more specifically, to management of network addresses in a virtual machine system.

BACKGROUND

A virtual machine system sometimes consists of multiple physical machines and runs multiple hypervisors on a single machine. Each hypervisor can support multiple virtual machines, with each virtual machine running a guest to perform tasks for a user. From time to time a system administrator may want to move ("migrate") a guest from one hypervisor to another for maintenance or performance reasons. The migration may be a "live migration," which means that the guest can be moved without disconnecting its client or application.

When a guest migrates to a different hypervisor ("target hypervisor"), its network location is changed. Switching components in the network (to which the guest is coupled) need to be notified of the guest's new location, so that the guest can continue to receive packets at its new location. One current approach is to rely on a device driver in the guest to forward the guest's network addresses to the target hypervisor, and the target hypervisor notifies the switching components. However, the guest operating system sometimes fails to supply a full list of the guest addresses to the device driver (e.g., when the network interface of the system operates in the promiscuous mode).

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system managing network addresses of a guest during live migration in a virtual machine system. In one embodiment, a computer system hosts a guest that is to migrate from a source hypervisor in the computer system to a target hypervisor during operation of the computer system. In response to the indication, the source hypervisor retrieves an address list of the guest from a network device, where the address list identifies one or more network addresses of the guest in one or more networks. The source hypervisor then forwards the address list to the target hypervisor, which notifies the one or more networks of the migration of the guest.

Throughout the following description, the term "network device" is used to refer to a hardware device, an emulated device in a hypervisor, or a software device that connects either two machines in a network or a machine to a network. Such device includes a network interface card (NIC), a bridge, a switch, a router, etc. It is understood that other network devices may be included. The term "guest" refers to the software that runs or can run on the hypervisor that is installed on a disk, loaded into memory, or currently running. A guest may include one or more of the following: a firmware copy in memory, an operating system, additional installed software, a browser, applications running on the browser, etc. The term "virtual machine (VM)" refers to part of a hypervisor that is visible to the guest. A virtual machine may include one or more of the following: memory, virtual CPU, virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest, etc.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
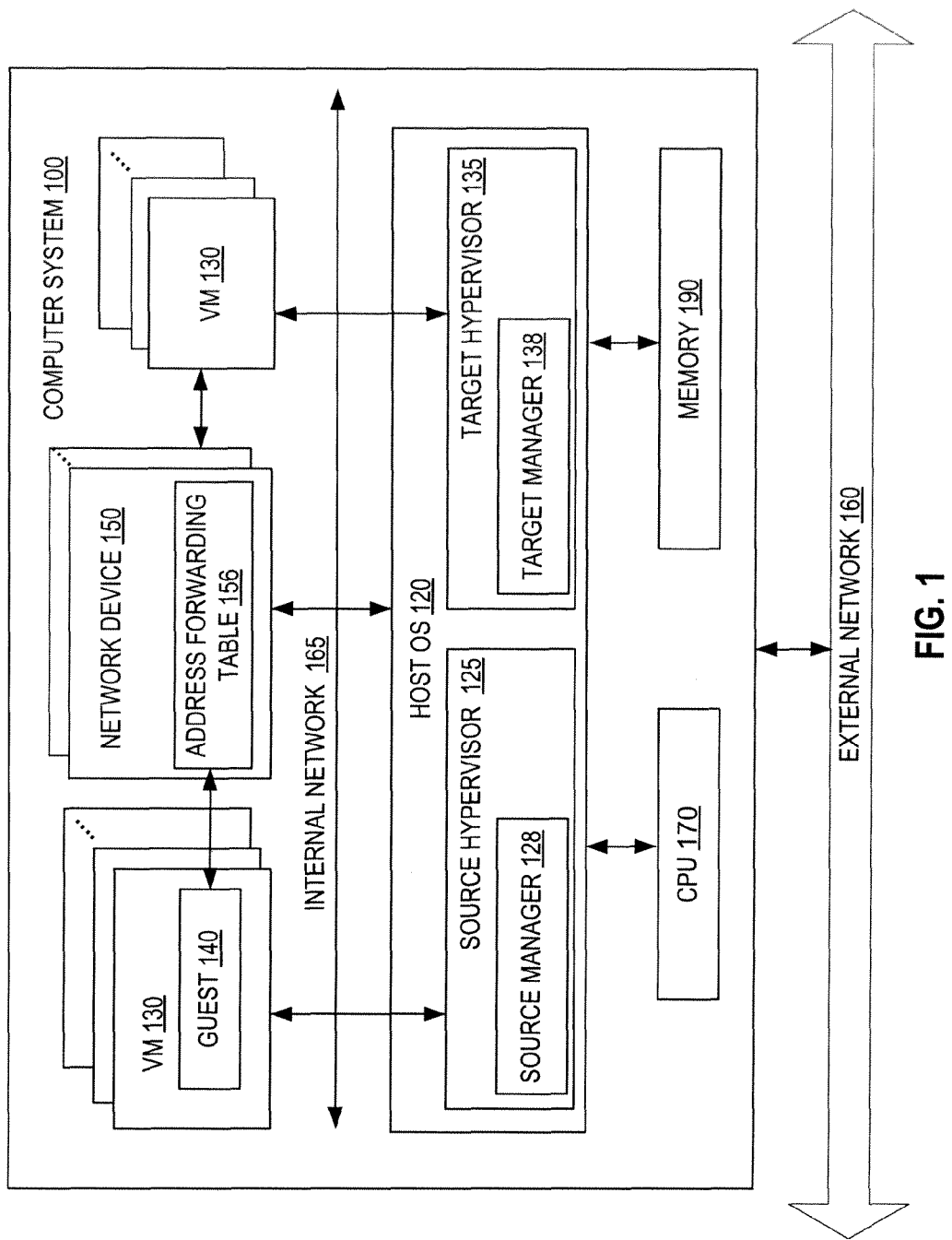
FIG. 1 is a block diagram of a computer system in which a guest migrates from one hypervisor to another hypervisor.

FIG. 1 is a block diagram that illustrates an embodiment of a computer system 100 in which embodiments of the present invention may operate. The computer system 100 hosts a plurality of virtual machines (VM) 130. Each virtual machine 130 runs a guest (e.g., guest 140) that uses a guest operating system to manage its resources. The virtual machines 130 may run the same or different guest operating systems, such as Microsoft Windows®, Linux®, Solaris®, Mac® OS, etc. The computer system 100 may be a server, a workstation, a personal computer (PC), a mobile phone, a palm-sized computing device, a personal digital assistant (PDA), etc.

The computer system 100 also runs a host OS 120 to manage system resources. In one embodiment, the computer system 100 runs multiple hypervisors 125, 135 (only two are shown) to virtualize access to the underlying host hardware, making the use of the virtual machine 130 transparent to the guest 140 and the users of the computer system 100. In one embodiment, the hypervisors 125 and 135 may be hypervisors in the user space sharing a single hypervisor kernel (not shown). Each of the hypervisors 125 and 135 may support multiple virtual machines 130.

In one embodiment, the computer system 100 is accessible by remote systems via an external network 160. The external network 160 may be a private network (e.g., a local area network (LAN), a wide area network (WAN), intranet, etc.) or a public network (e.g., the Internet). In some embodiments, the computer system 100 may additionally include an optional internal network 165 for facilitating the communication among the virtual machines 130. In one embodiment, the virtual machines 130 are also on one or more virtual networks. For example, the external network 160 and/or the internal network 165 may be a physical LAN that is partitioned into multiple virtual LANs (VLANs). Each of the VLANs can be identified by a VLAN tag. A single guest may be on multiple VLANs and, therefore, may have multiple VLAN tags. Thus, each guest 140 in the computer system 100 may be identified by a list of network addresses, such as: physical network addresses (e.g., Media Access Control (MAC) addresses), virtual network addresses (e.g., virtual local area network (VLAN) tags), a combination of the above, or other types of network addresses.

The computer system 100 also includes hardware components such as one or more physical central processing units (CPUs) 170, memory 190, and other hardware components.

In one embodiment, the computer system 100 also includes one or more network devices (e.g., network device 150) coupled to the networks 160 and 165. Although not shown in the embodiment of FIG. 1, some of the network devices may be internal to the computer system 100 and some others may be external to the computer system 100. Examples of the network devices include switches, bridges, network interface cards (NICs), routers, and any network components that track the transmission of packets on the networks 160 and 165. The network devices may be hardware devices, emulated devices in the source hypervisor 125, software devices, or a combination of the above. One or more of the network devices (e.g., the network device 150) may be designated by the computer system 100 to forward packets that are sent from the guest 140. Thus, the location of the guest 140 on the networks 160 and 165 can be tracked by the network device 150. The network device 150 maintains and updates forwarding information in its memory. In one embodiment, the forwarding information is stored in an address forwarding table 156 in the network device 150.

In one embodiment, one of the guests (e.g., guest 140) may migrate from one hypervisor (e.g., the source hypervisor 125) to another hypervisor (e.g., the target hypervisor 135) during operation of the computer system 100. The migration may be a "live migration," which means that the guest 140 can be moved without disruption to the users of the virtual machines 130. After the migration, the network location of the guest 140 is changed. To reach the guest 140 at its new location, network devices in the networks 160 and 165 need to be notified of the location change. The migration does not change the network addresses of the guest 140. Nevertheless, the migration changes the association between the guest 140 and the hypervisors 125 and 135.

According to one embodiment of the present invention, the source hypervisor 125 includes a source manager 128 to manage the network location of the guests associated with the source hypervisor 125. Likewise, the target hypervisor 135 includes a target manager 138 to manage the network location of the guest associated with the target hypervisor 135. When the guest 140 migrates from the source hypervisor 125 to the target hypervisor 135, network devices in the networks 160 and 165 are informed of a list of addresses of the guest 140, as well as the new association between the guest 140 and the target hypervisor 135 to allow packets destined for the guest 140 be properly forwarded. Embodiments of the present invention enable the source hypervisor 125 to obtain the address list of the migrating guest 140 from the network device 150, without the guest 140 having to send the address list to either the source hypervisor 125 or the target hypervisor 135. The address list is collected by the network device 150 when packets were sent from the guest 140 in the past. These packets include one or more of the network addresses of the guest 140 for identifying the source of the packets. By spoofing the traffic on the networks and recording the source addresses in these packets, the network device 150 can build the address forwarding table 156 that contains the guest's address list and the guest ID (which is the guest's network location in terms of the guest's association with the network device 150).

In one embodiment, when the source hypervisor 125 is notified that the guest 140 is to migrate to the target hypervisor 135, the source hypervisor 125 retrieves the guest's address list from the network device 150 and sends the address list to the target hypervisor 135. The target hypervisor 135 then forwards the address list to all of the network devices in the networks 160 and 165, notifying the network devices of the new location of the guest 140. In one embodiment, the new location of the guest 140 is recorded in the address forwarding table 156 as an association between the guest 140 and the target hypervisor 135.

Figure 2:
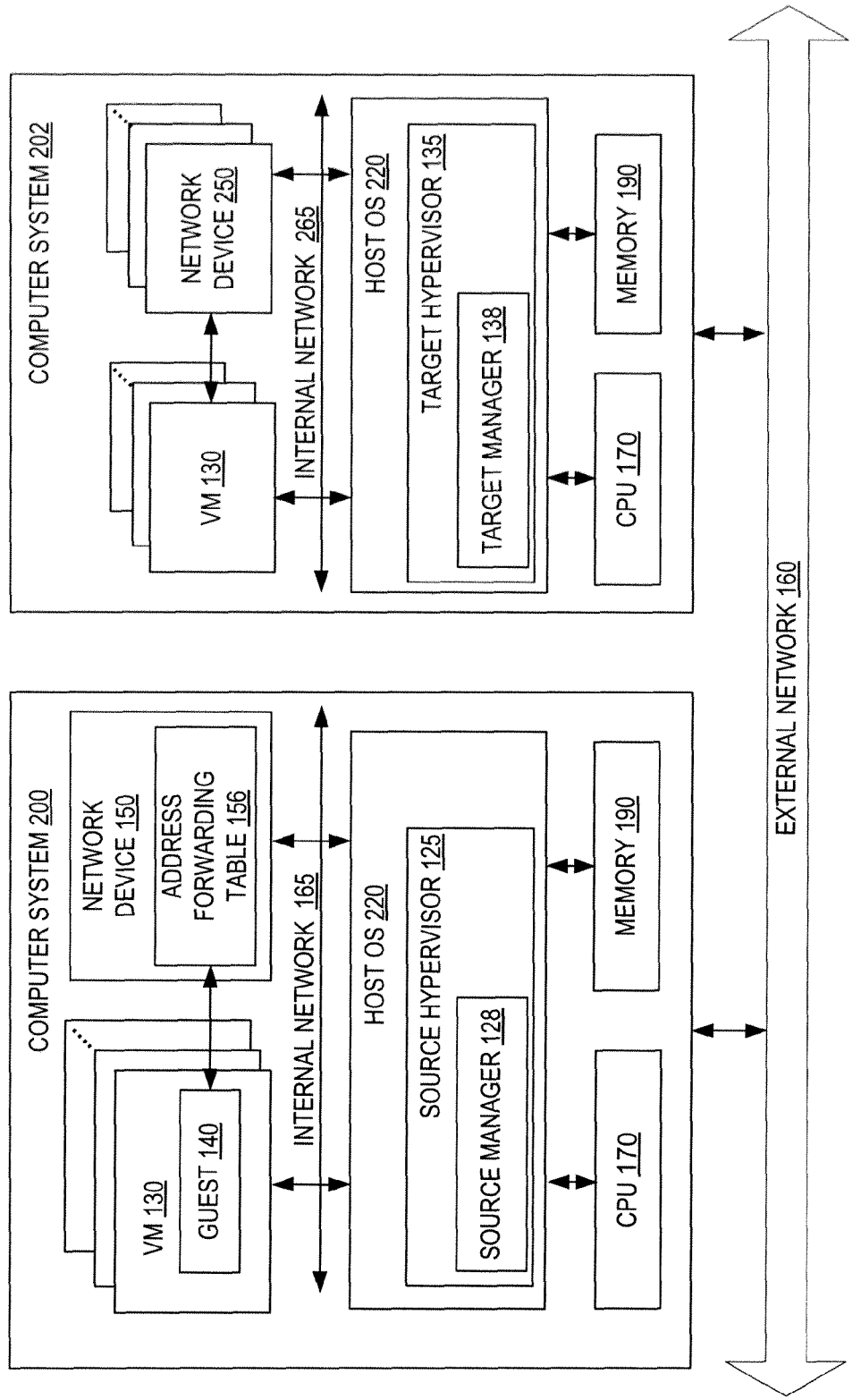
FIG. 2 is a block diagram of two computer systems in which a guest migrates from one computer system to another computer system.

FIG. 2 is a block diagram that illustrates another environment in which embodiments of the present invention may operate. In this environment, the guest 140 can migrate from one computer system 200 to another computer system 202 during operation of the computer systems 200 and 202 without disruption to the users of the virtual machines 130. Similar to the computer system 100, each of the computer systems 200 and 202 may be a server, a workstation, a personal computer (PC), a mobile phone, a palm-sized computing device, a personal digital assistant (PDA), etc. Each of the computer systems 200 and 202 runs a host OS 220 to manage system resources. In one embodiment, the computer systems 200 and 202 may run the same or different host operating systems. Each of the virtual machines 130 on the computer systems 200 and 202 may also run the same or different guest operating systems.

In one embodiment, each of the computer systems 200 and 202 runs one or more hypervisors (only one hypervisor is shown) to virtualize access to the underlying host hardware. When the guest 140 migrates from the computer system 200 to the computer system 202 during operating of the computer systems 200 and 202, the guest 140 becomes disassociated from the source hypervisor 125 and associated with the target hypervisor 135. Similar to the embodiment of FIG. 1, the migration changes the association between the guest 140 and the hypervisors 125 and 135 but does not change the network addresses of the guest 140.

According to one embodiment of the present invention, when live migration of the guest 140 is taking place, the source hypervisor 125 obtains the address list of the migrating guest 140 from the network device 150, without the guest 140 having to send the address list to either the source hypervisor 125 or the target hypervisor 135. The address list is collected by the network device 150 when packets were sent from the guest 140 in the past. These packets include one or more of the network addresses of the guest 140 for identifying the source of the packets. By spoofing the traffic on the networks and recording the source addresses in these packets, the network device 150 can build the address forwarding table 156 that contains the guest's address list and the guest ID (which is the guest's network location in terms of the guest's association with the network device 250).

In the embodiment of FIG. 2, the network devices 150 and 250 are shown to be internal to the computer systems 200 and 202, respectively. In alternative embodiments, one or more of the network devices 150 and 250 may be external to the computer system 200 and 202. The network devices 150 and 250 may include a switch, a bridge, a network interface card (NIC), a router, and any network component that tracks the transmission of packets on the networks 160 and 165. Each of the network devices 150 and 250 may be a hardware device, an emulated device in the source hypervisor 125, a software device, or a combination of the above.

Figure 3:
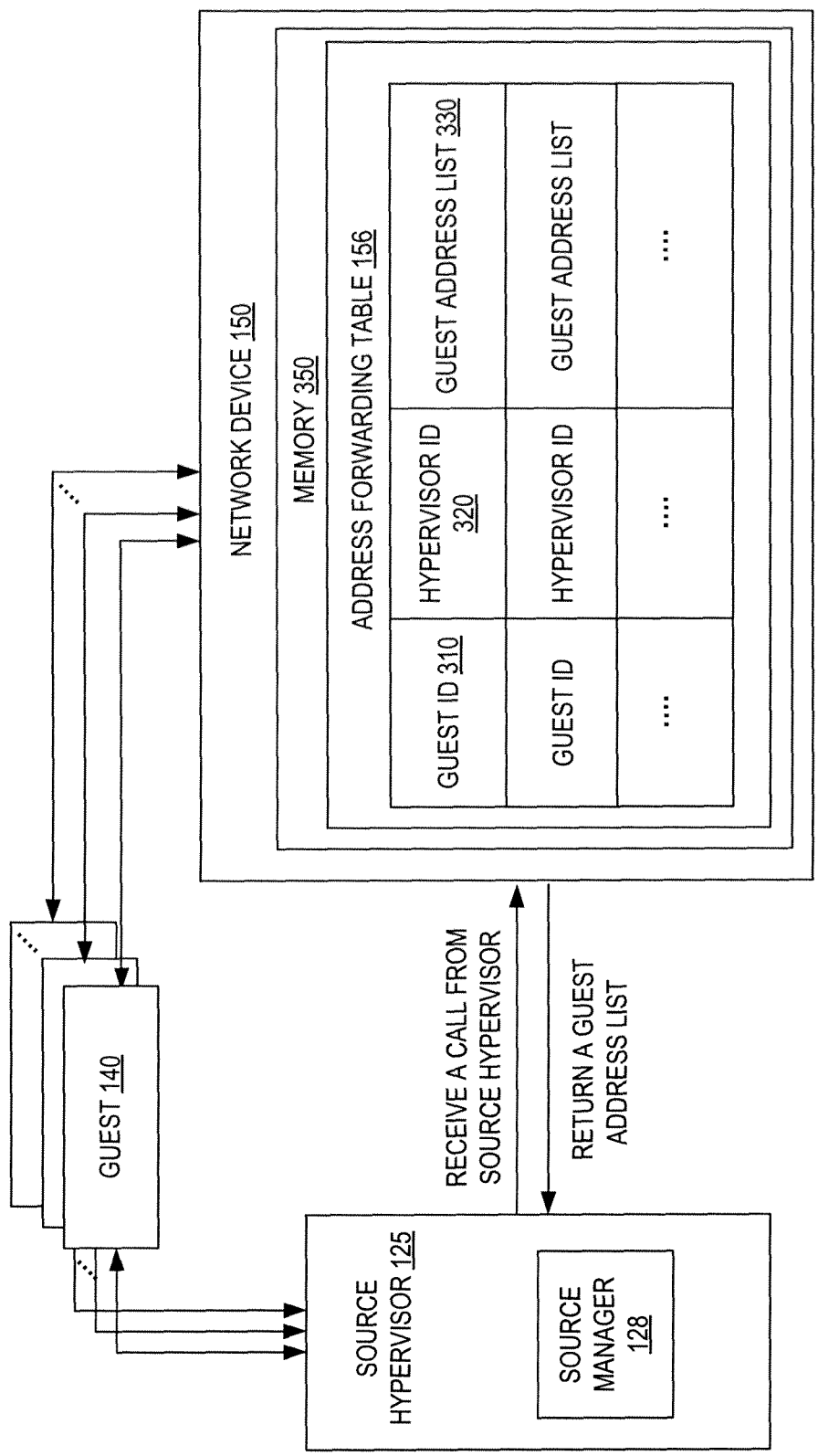
FIG. 3 illustrates an example of an interaction between a source hypervisor and a network device that maintains an address forwarding table.

FIG. 3 illustrates an example of an interaction between the source hypervisor 125 and the network device 150. In one embodiment, the network device 150 maintains and updates the address forwarding table 156 in its memory 350 during the normal course of network operation. The network device 150 collects the source network addresses from packets that are sent out from the guest 140. The network addresses may include physical network addresses and virtual network addresses. In one embodiment, the network addresses include one or more MAC addresses. In an alternative embodiment, the network addresses include one or more MAC address and VLAN tag pairs.

In one embodiment, the network device 150 adds the collected source network addresses to the address list 330 associated with an identifier of the guest 140 (guest ID 310). The guest ID 310 identifies the connection between the network device 150 and the guest 140 in a scenario where multiple guests are using the same network device 150. If there is a single guest using the network device 150 (e.g., an emulated NIC), the guest ID can be empty. In one example, a guest connected to a network bridge device can have the connection port number as its guest ID. In another example, when there are multiple guests with each guest using a separate VLAN, the VLAN tag can serve as the guest ID. In the latter two examples, the network device 150 may optionally record an identifier of the hypervisor (hypervisor ID 320) with which the guest 140 is associated. The hypervisor ID 320 can be the port number connecting a hypervisor to the network device 150. The hypervisor ID 320 does not need to uniquely identify a single hypervisor. If multiple hypervisors have same ID, these hypervisors will be allowed to retrieve the address forwarding table 156 for each other. The use of the hypervisor ID 320 can be an optional security feature where the network device 150 only allows requests for the address forwarding table 156 from the source hypervisor 125 or from a privileged source. For example, upon receiving a request for retrieving an address list, the network device 150 may verify the source of the request (e.g., by verifying that the hypervisor ID 320 identifies the source hypervisor 125), grant the request if it is from the source hypervisor 125 and deny the request otherwise. In another embodiment, some requests may be flagged as administrative (e.g., by a policy set in the network device 150). The network device 150 may allow such requests regardless of where the requests come from (e.g., even when the hypervisor ID indicated in the request does not identify the source hypervisor 125 or a privileged source).

In one embodiment, when the source hypervisor 125 receives a command or other indication that the guest 140 is about to migrate to the target hypervisor 135, the source hypervisor 125 makes a call to the network device 150 where the address forwarding table 156 is maintained. In one embodiment, the call may be sent in the form of an Internet Group Management Protocol (IGMP) packet, a Simple Network Management Protocol (SNMP) packet or some other management packet or packets. The call includes the guest ID 310. Upon receiving the call from the source hypervisor 125, the network device 150 retrieves the address list 330 associated with the guest 140 from the address forwarding table 156, and returns the address list 330 to the source hypervisor 125. The source hypervisor 125 forwards the address list 330 to the target hypervisor 135, which then notifies the network devices in the networks 160 and 165 of the location change of the guest 140.

Figure 4:
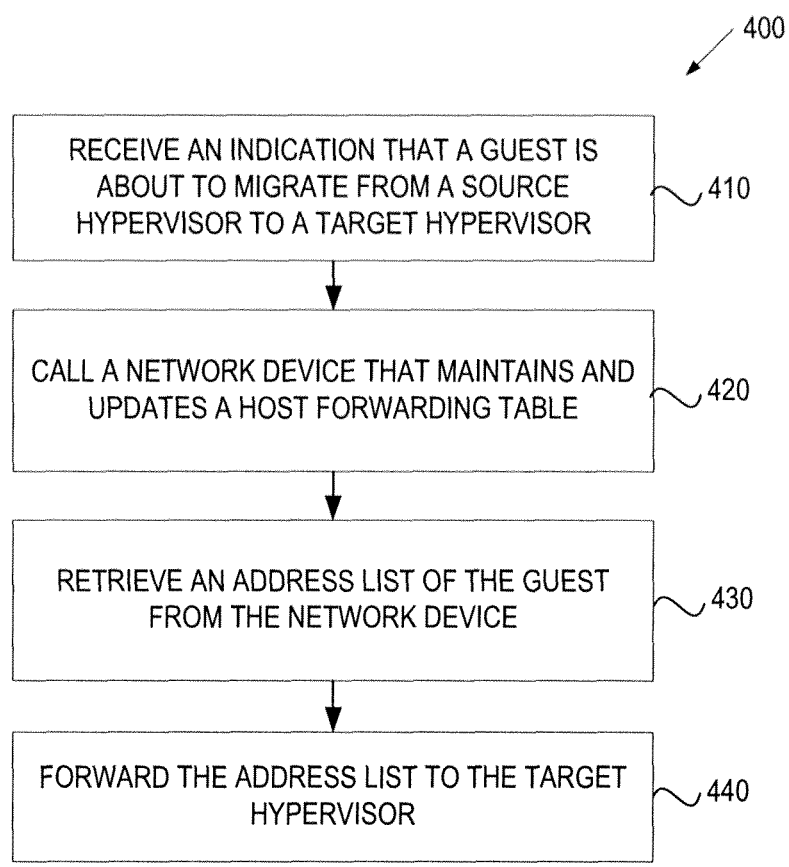
FIG. 4 is a flow diagram of one embodiment of a method for migrating a guest.

FIG. 4 is a flow diagram illustrating one embodiment of a method 400 for migrating the guest 140. The method 400 may be performed by a computer system 600 of FIG. 6 that may comprise hardware (e.g., circuitry, dedicated logic, programmable logic, microcode, etc.), software (e.g., instructions run on a processing device), or a combination thereof. In one embodiment, the method 400 is performed by the source manager 128 of the source hypervisor 125 of FIG. 1 and FIG. 2.

Referring to FIG. 4, in one embodiment, the method 400 begins when the source manager 128 receives an indication that the guest 140 (which is originally associated with the source hypervisor 125) is about to migrate to the target hypervisor 135 (block 410). The indication may be a command from a system administrator, a management application, or other sources. In response, the source manager 128 calls the network device 150 that maintains the address forwarding table 156 (block 420), and retrieves an address list associated with the guest 140 (block 430). The source manager 128 then forwards the address list to the target manager 138 of the target hypervisor 135 (block 440). The target hypervisor 135 then notifies (e.g., by broadcasting) network devices in the networks 160 and 165 of the location change of the guest 140. The network devices receiving the notification may include hardware devices, emulated devices, software devices, or a combination of the above. As a result, when new packets destined for the guest 140 arrive at any of these network devices, the network devices 150 can correctly forward the packets to the guest 140 at its new location.

Figure 5:
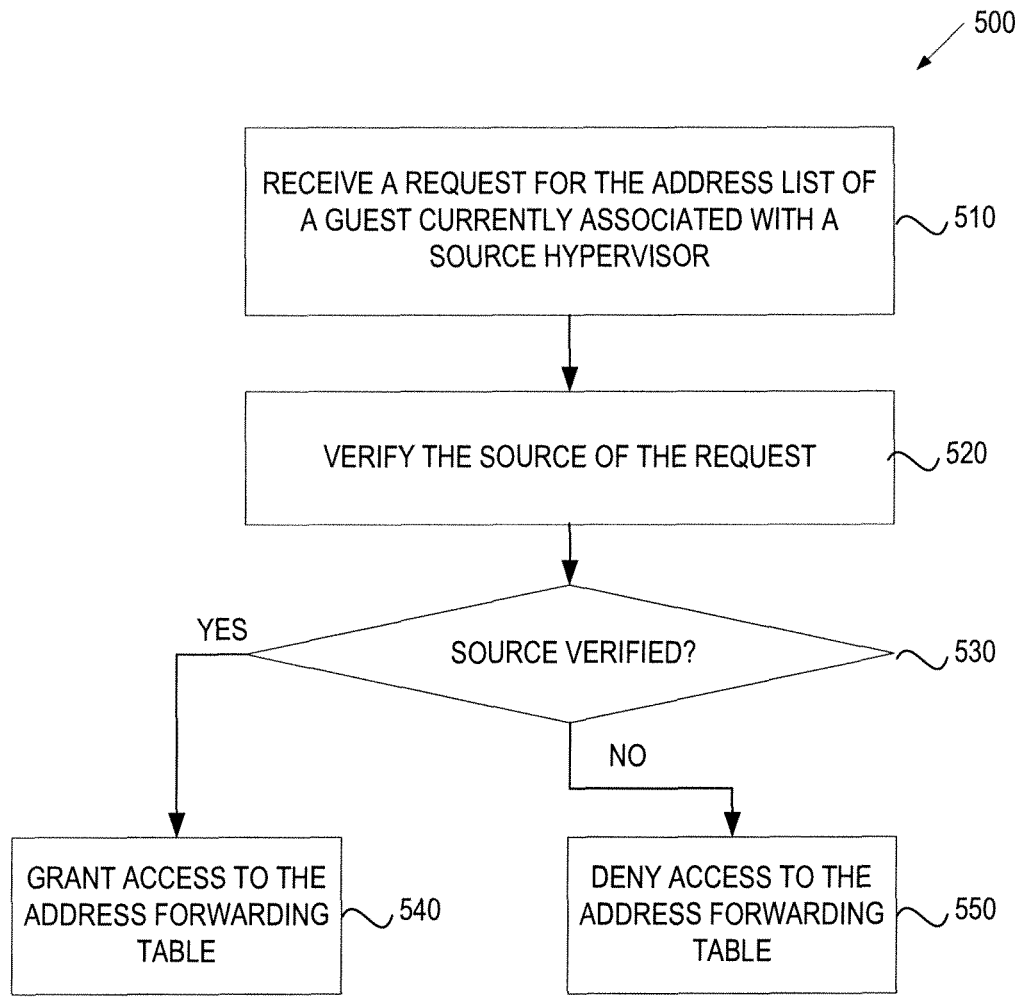
FIG. 5 is a flow diagram of one embodiment of a method for granting access to an address forwarding table.

FIG. 5 is a flow diagram illustrating one embodiment of a method 500 for granting access to an address forwarding table. The method 500 may be performed by a computer system 600 of FIG. 6 that may comprise hardware (e.g., circuitry, dedicated logic, programmable logic, microcode, etc.), software (e.g., instructions run on a processing device), or a combination thereof. In one embodiment, the method 500 is performed by the network device 150 of FIG. 1 and FIG. 2.

Referring to FIG. 5, in one embodiment, the method 500 begins when the network device 150 receives a request for an address list associated with a given guest ID 310 from the address forwarding table 156 (block 510). The guest ID 310 belongs to a guest 140 that is currently associated with (that is, running on) the source hypervisor 125. The network device 150 verifies the source of the request (block 520). In one embodiment, the request contains a hypervisor ID, which identifies the source of the request. The network device 150 verifies whether the hypervisor ID in the request is the ID of the source hypervisor; that is, the hypervisor with which the guest 140 has been associated. In one embodiment, the network device 150 may additionally verify whether the request is an administrative request, that is, whether the source of the request identifies a privileged source (which may or may not be a hypervisor) that has privileges to access the address forwarding table 156. For example, a privileged source may be any source that is attached to a designated port of a bridge network device, where the port is designated as an administrative port. As another example, a privileged source may be an administrative console attached to the network 160 or 165, where the MAC address of the administrative console can be programmed into the network device 150 to identify the console. According to a predetermined access policy, the network device 150 may grant access to the address forwarding table 156 if the request is administrative, regardless of the hypervisor ID identified in the request. Based on the result of the verification, the network device 150 may grant access to the address forwarding table 156 (e.g., when the hypervisor ID is verified and/or when the request is administrative) (block 540), or deny the access to the address forwarding table 156 (block 550).

Figure 6:
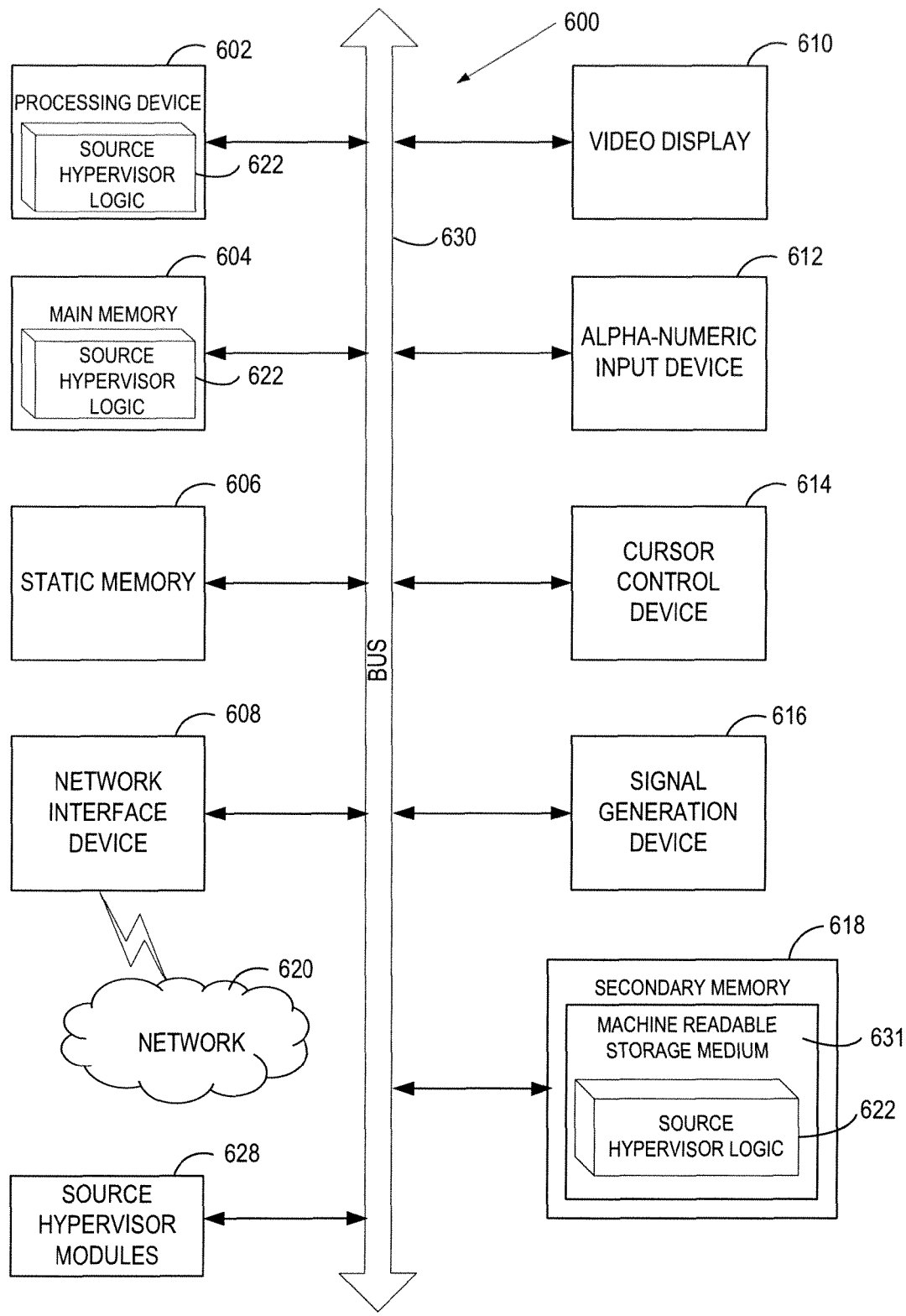
FIG. 6 illustrates a diagrammatic representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

The processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute source hypervisor logic 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or more specifically a computer-readable storage medium) 631 on which is stored one or more sets of instructions (e.g., source hypervisor logic 622) embodying any one or more of the methodologies or functions described herein (e.g., the source hypervisor 125 of FIGS. 1 and 2). The source hypervisor logic 622 may also reside, completely or at least partially, within the main memory 604 and/or within the processing device 602 during execution thereof by the computer system 600; the main memory 604 and the processing device 602 also constituting machine-readable storage media. The source hypervisor logic 622 may further be transmitted or received over a network 620 via the network interface device 608.

The machine-readable storage medium 631 may also be used to store the source hypervisor logic 622 persistently. While the machine-readable storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that causes the machine to perform any one or more of the methodologies of the present invention. The term "machine-readable storage medium" shall accordingly be taken to include, but not be limited to, solid-state memories, and optical and magnetic media.

The computer system 600 may additionally include source hypervisor modules 628 for implementing the functionalities of the source hypervisor 125 of FIGS. 1 and 2. The module 628, components and other features described herein (for example in relation to FIG. 1) can be implemented as discrete hardware components or integrated in the functionality of hardware components such as ASICS, FPGAs, DSPs or similar devices. In addition, the module 628 can be implemented as firmware or functional circuitry within hardware devices. Further, the module 628 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing tennis such as "receiving", "retrieving", "forwarding", "sending", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
receiving an indication to migrate a guest from a source hypervisor in a computer system to a target hypervisor during operation of the computer system;
in response to receiving the indication to migrate the guest, retrieving, by the source hypervisor and without involvement of the guest, an address list of the guest from a network device that forwards packets of the guest to one or more networks, the address list identifying one or more network addresses of the packets of the guest in the one or more networks,
wherein retrieving the address list of the guest from the network device comprises:
sending a request for retrieving the address list of the guest to the network device, the request comprising a hypervisor identifier of the source hypervisor; and
receiving, from the network device, the address list associated with the hypervisor identifier of the source hypervisor and a guest identifier of the guest; and
forwarding, by a processing device executing the source hypervisor, the address list to the target hypervisor to notify the one or more networks of the migration of the guest.

2. The method of claim 1, wherein the address list is recorded in an address forwarding table that was updated by the network device when the guest sent out packets to the one or more networks before migration.

3. The method of claim 1, wherein the address list includes: one or more physical network address, one or more virtual network addresses, or a combination of the above.

4. The method of claim 1, wherein the network device maintains an address forwarding table that records an association between the guest identifier of the guest and the hypervisor identifier of the source hypervisor.

5. The method of claim 4, further comprising:
verifying, by the network device, a source of the request for retrieving the address list; and
in response to a determination that the source is verified, granting retrieval of the address list.

6. The method of claim 4, wherein the network device protects access to the address forwarding table by verifying that the hypervisor identifier in the request identifies the source hypervisor or a privileged source.

7. The method of claim 4, further comprising:
determining, by the network device, whether the request for retrieving the address list is administrative; and
in response to a determination that the request is administrative, granting retrieval of the address list.

8. The method of claim 1, wherein the network device includes one of the following devices: a hardware network interface card (NIC), a hardware bridge, a hardware switch, a hardware router, an emulated NIC, an emulated bridge, an emulated switch, or an emulated router.

9. A system comprising:
a memory;
a processing device, coupled to the memory; and
a source hypervisor, executed from the memory by the processing device, to:
receive an indication to migrate a guest from the source hypervisor to a target hypervisor;
in response to receiving the indication to migrate the guest, retrieve, without involvement of the guest, an address list of the guest from a network device that forwards packets of the guest to one or more networks, wherein the address list identifies one or more network addresses of packets of the guest in the one or more networks,
wherein to retrieve the address list of the guest from the network device, the processing device is to:
send a request for retrieving the address list of the guest to the network device, the request comprising a hypervisor identifier of the source hypervisor; and
receive, from the network device, the address list associated with the hypervisor identifier of the source hypervisor and a guest identifier of the guest; and
forward the address list to the target hypervisor to notify the one or more networks of the migration of the guest.

10. The system of claim 9, wherein the address list is recorded in an address forwarding table that was updated by the network device when the guest sent out packets to the one or more networks before migration.

11. The system of claim 9, wherein the address list includes: one or more physical network address, one or more virtual network addresses, or a combination of the above.

12. The system of claim 9, wherein the network device maintains an address forwarding table that records an association between the guest identifier of the guest and the hypervisor identifier of the source hypervisor.

13. The system of claim 9, wherein the network device includes one of the following hardware devices: a network interface card (NIC), a bridge, a switch, or a router.

14. The system of claim 9, wherein the network device includes one of the following emulated or software devices: a network interface card (NIC), a bridge, a switch, or a router.

15. A non-transitory computer readable storage medium including instructions that, when executed by a processing system, cause the processing system to perform a method comprising:
receiving an indication to migrate a guest from a source hypervisor in a computer system to a target hypervisor during operation of the computer system;
in response to receiving the indication to migrate the guest, retrieving, by the source hypervisor and without involvement of the guest, an address list of the guest from a network device that forwards packets of the guest to one or more networks, the address list identifying one or more network addresses of the packets of the guest in the one or more networks, wherein retrieving the address list of the guest from the network device comprises:
  sending a request for retrieving the address list of the guest to the network device, the request comprising a hypervisor identifier of the source hypervisor; and
  receiving, from the network device, the address list associated with the hypervisor identifier of the source hypervisor and a guest identifier of the guest; and
  forwarding, by the source hypervisor, the address list to the target hypervisor to notify the one or more networks of the migration of the guest.

16. The computer readable storage medium of claim 15, wherein the address list is recorded in an address forwarding table that was updated by the network device when the guest sent out packets to the one or more networks before migration.

17. The computer readable storage medium of claim 15, wherein the address list includes: one or more physical network address, one or more virtual network addresses, or a combination of the above.

18. The computer readable storage medium of claim 15, wherein the network device maintains an address forwarding table that records an association between the guest identifier of the guest and the hypervisor identifier of the source hypervisor.

19. The computer readable storage medium of claim 18, the method further comprising:
  verifying, by the network device, a source of the request for retrieving the address list; and
  in response to a determination that the source is verified, granting retrieval of the address list.

20. The computer readable storage medium of claim 18, the method further comprising:
  determining, by the network device, whether the request for retrieving the address list is administrative; and
  in response to a determination that the request is administrative, granting retrieval of the address list.

21. The computer readable storage medium of claim 18, wherein the network device protects access to the address forwarding table by verifying that the hypervisor identifier in the request identifies the source hypervisor or a privileged source.

22. The computer readable storage medium of claim 15, wherein the network device includes one of the following devices: a hardware network interface card (NIC), a hardware bridge, a hardware switch, a hardware router, an emulated NIC, an emulated bridge, an emulated switch, or an emulated router.

* * * * *